United States Patent [19]
Garner

[11] Patent Number: 5,242,205
[45] Date of Patent: Sep. 7, 1993

[54] VEHICULAR COVER LOCK APPARATUS

[76] Inventor: John M. Garner, 2040 Munhall Ave., Pomona, Calif. 91766

[21] Appl. No.: 884,914

[22] Filed: May 18, 1992

[51] Int. Cl.[5] .......................................... B60J 11/00
[52] U.S. Cl. ................................. 296/136; 150/166; 160/370.2 R; 340/429; 70/18; 70/DIG. 49
[58] Field of Search .............. 296/136; 150/166, 168; 160/370.2; 340/426, 429, 568; 70/18, DIG. 49

[56] References Cited
U.S. PATENT DOCUMENTS

| | | | |
|---|---|---|---|
| 2,646,118 | 7/1953 | Berty | 296/95.1 |
| 4,355,839 | 10/1982 | Rosen | 296/136 |
| 4,526,416 | 7/1985 | Rode | 70/18 |
| 4,698,615 | 10/1987 | Wilber | 340/568 |

FOREIGN PATENT DOCUMENTS

| | | | |
|---|---|---|---|
| 1114806 | 4/1956 | France | 340/429 |
| 54-23706 | 8/1979 | Japan | 296/136 |

*Primary Examiner*—Dennis H. Pedder
*Attorney, Agent, or Firm*—Leon Gilden

[57] ABSTRACT

A lock structure arranged in combination with a vehicular cover is constructed to include a flexible cable sheath having a plurality of cable strands directed therethrough, with a forward ring mounted to a forward distal end of the sheath and cables. An anchor block mounted fixedly to a rear distal end of the cable has an anchor ring secured thereto for positioning with a vehicular passenger compartment. The cables and sheath are directed through a grommet portion of a vehicular flexible cover, with a lock mechanism mounted through the forward ring. A modification of the invention includes alarm structure mounted within the anchor block.

5 Claims, 4 Drawing Sheets

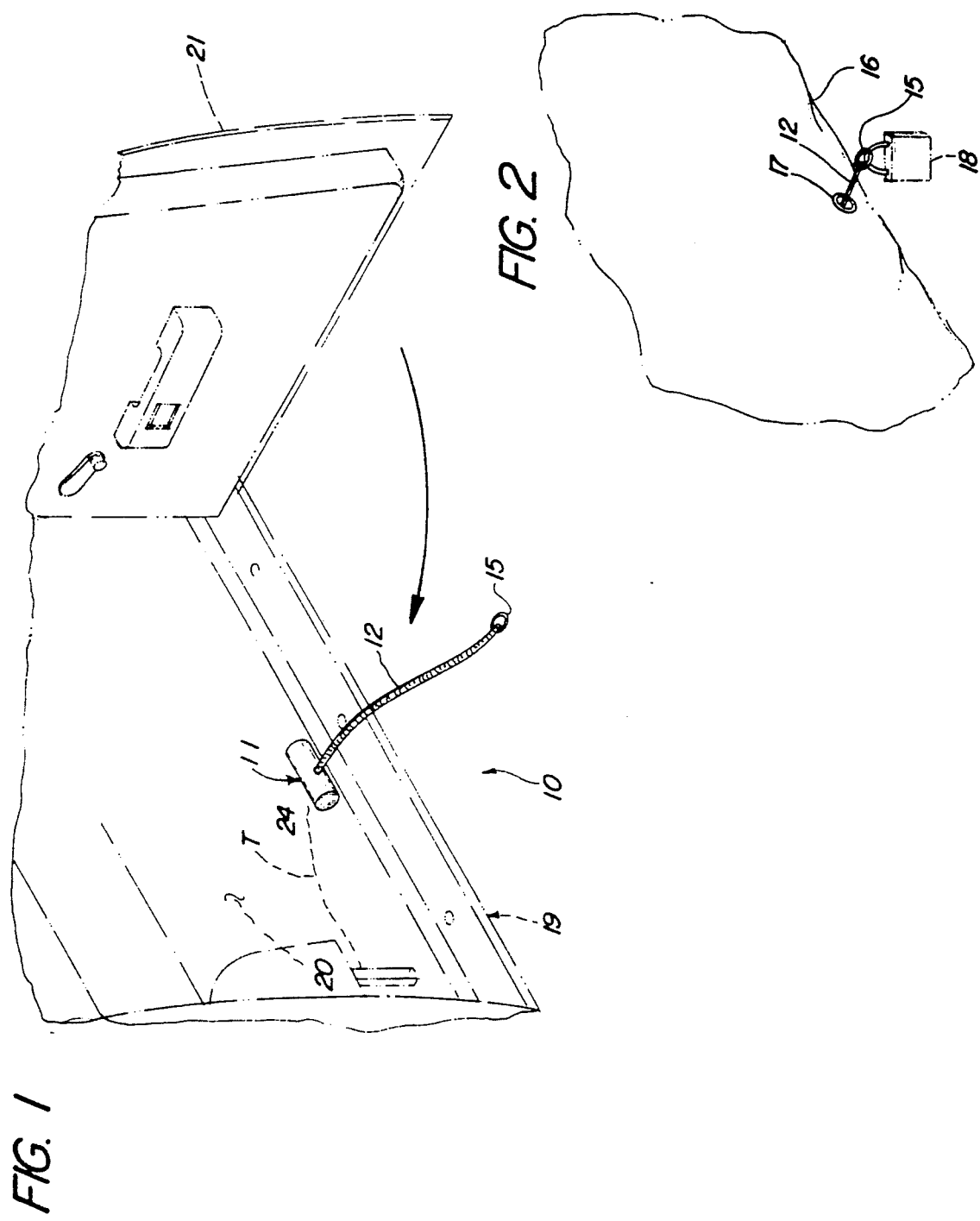

VEHICULAR COVER LOCK APPARATUS

BACKGROUND OF THE INVENTION

1. Field of the Invention

The field of invention relates to vehicular cover apparatus, and more particularly pertains to a new and improved vehicular cover lock apparatus wherein the same is arranged to securely mount a flexible cover about a vehicle exterior surface.

2. Description of the Prior Art

Use of vehicular covers in various environments such as public garages, driveways, and the like to protect a vehicle from climactic erosion is available in the prior art, but due to contemporary problems, such covers are subject to theft, vandalism, and the like. The instant invention attempts to overcome deficiencies of the prior art by providing for a vehicular cover arrangement arranged to securely mount a vehicular cover relative to a vehicle's exterior surface.

Prior art apparatus relative to vehicular cover structure is arranged in U.S. Pat. No. 4,938,522 to Herron, et al.

U.S. Pat. No. 4,958,881 to Piros sets forth a vehicular protective covering having anti-theft mechanisms therewithin, such as blocks mounted within the vehicular trunk and the like to prevent theft.

Similarly, U.S. Pat. No. 4,925,234 to Park, et al. sets forth a vehicular cover having members arranged for mounting within the interior portion of the vehicle for protective mounting of the vehicle cover.

As such, it may be appreciated that there continues to be a need for a new and improved vehicular cover lock apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of vehicular cover lock apparatus now present in the prior art, the present invention provides a vehicular cover lock apparatus wherein the same is arranged to mount an anchor block within a vehicular passenger compartment, with the anchor block having cable structure secured to the associated cover for preventing unwarranted removal and tampering of the cover structure. As such, the general purpose of the present invention, which will be described subsequently in greater detail, is to provide a new and improved vehicular cover lock apparatus which has all the advantages of the prior art vehicular cover lock apparatus and none of the disadvantages.

To attain this, the present invention provides a lock structure arranged in combination with a vehicular cover and constructed to include a flexible cable sheath having a plurality of cable strands directed therethrough, with a forward ring mounted to a forward distal end of the sheath and cables. An anchor block mounted fixedly to a rear distal end of the cable has an anchor ring secured thereto for positioning within a vehicular passenger compartment. The cables and sheath are directed through a grommet portion of a vehicular flexible cover, with a lock mechanism mounted through the forward ring. A modification of the invention includes alarm structure mounted within the anchor block.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular cover lock apparatus which has all the advantages of the prior art vehicular cover lock apparatus and none of the disadvantages.

It is another object of the present invention to provide a new and improved vehicular cover lock apparatus which may be easily and efficiently manufactured and marketed.

It is a further object of the present invention to provide a new and improved vehicular cover lock apparatus which is of a durable and reliable construction.

An even further object of the present invention is to provide a new and improved vehicular cover lock apparatus which is susceptible of a low cost of manufacture with regard to both materials and labor, and which accordingly is then susceptible of low prices of sale to the consuming public, thereby making such vehicular cover lock apparatus economically available to the buying public.

Still yet another object of the present invention is to provide a new and improved vehicular cover lock apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the invention arranged to illustrate the mounting of the cover lock apparatus within the passenger compartment of an associated vehicle.

FIG. 2 is an isometric enlarged illustration of the lock apparatus directed through an associated vehicular cover.

DESCRIPTION OF THE PREFERRED EMBODIMENT

Figure 3:
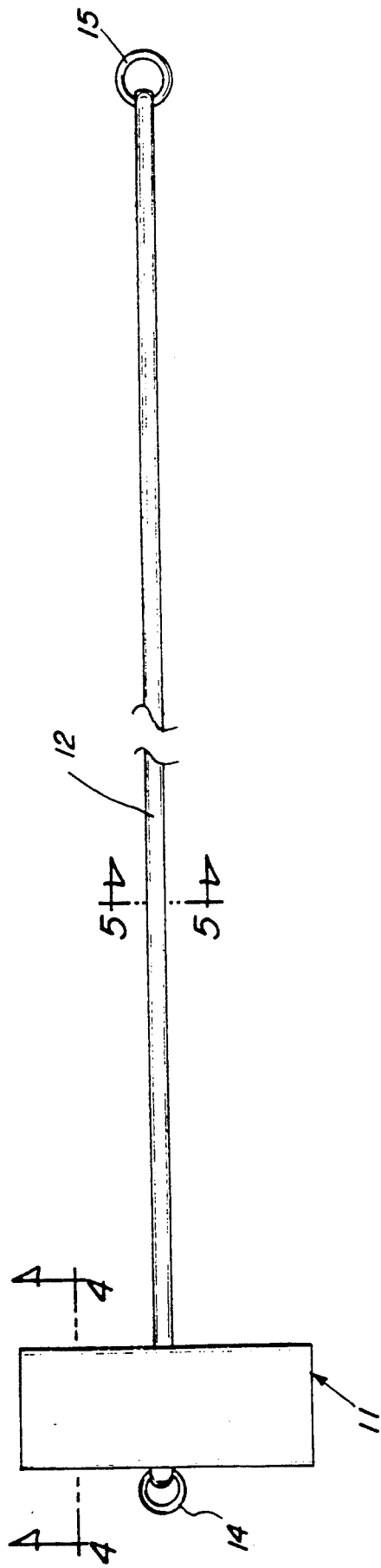
FIG. 3 is an orthographic top view of the invention.
Figure 4:
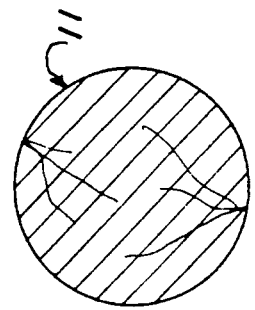
FIG. 4 is an orthographic view, taken along the lines 4—4 of FIG. 3 in the direction indicated by the arrows.
Figure 5:
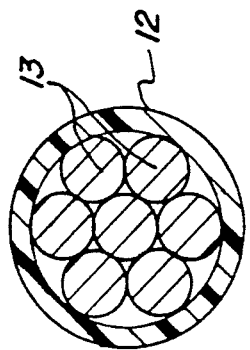
FIG. 5 is an orthographic view, taken along the lines 5—5 of FIG. 3 in the direction indicated by the arrows.
Figure 6:
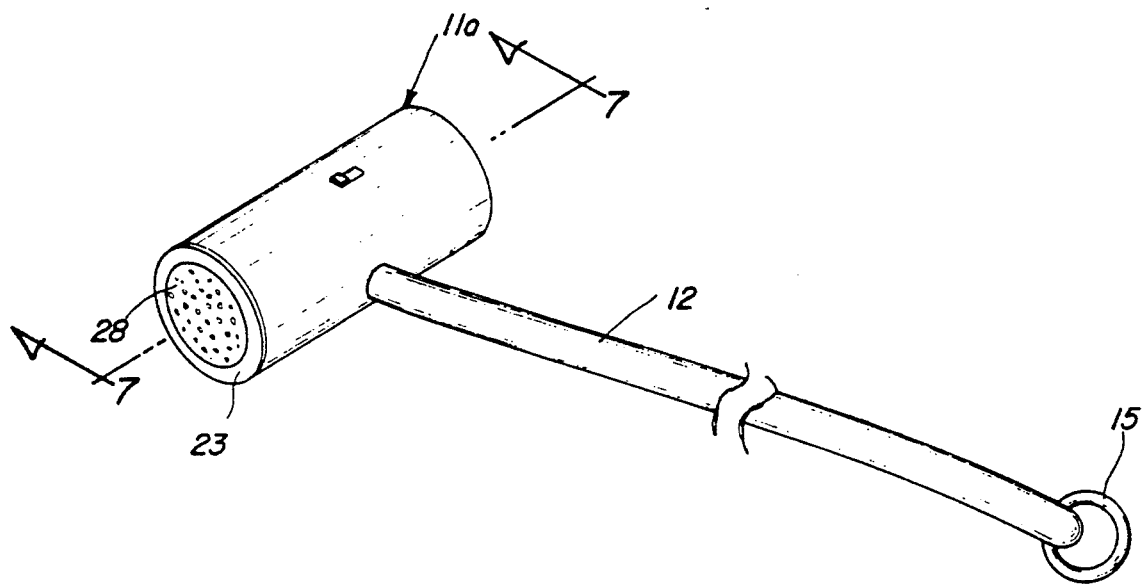
FIG. 6 is an isometric illustration of a modified aspect of the invention.
Figure 7:
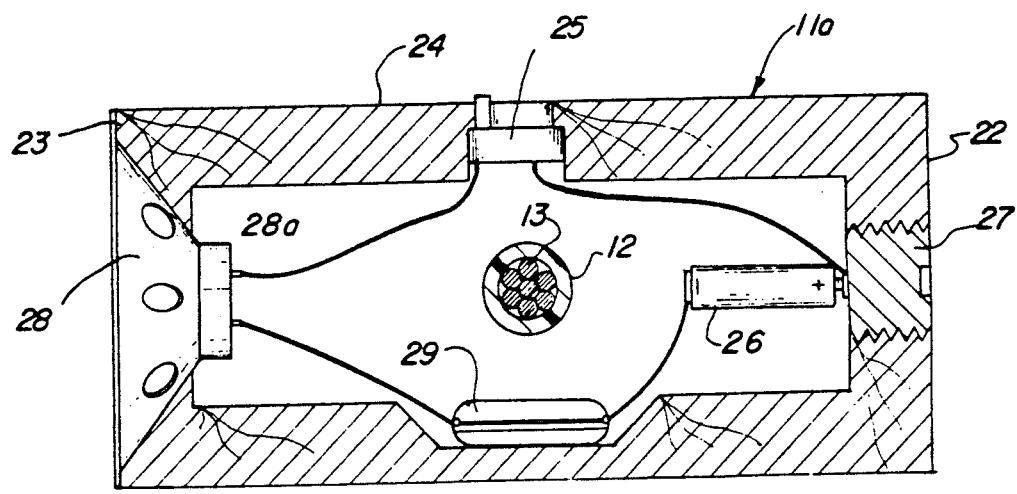
FIG. 7 is an orthographic view, taken along the lines 7—7 of FIG. 6 in the direction indicated by the arrows.
Figure 8:
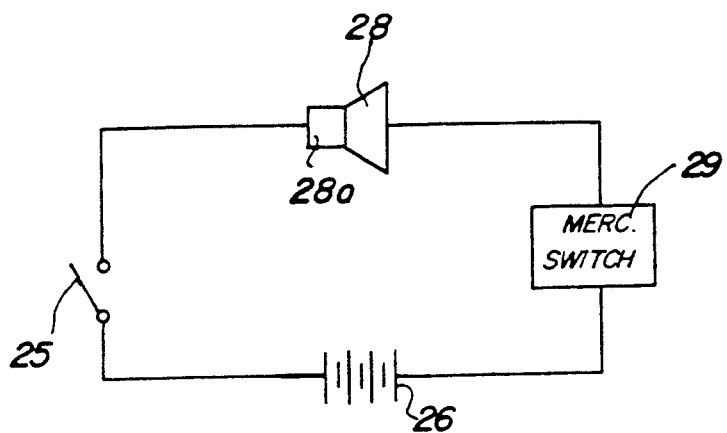
FIG. 8 is a diagrammatic illustration of the electrical circuitry utilized by the invention.
Figure 9:
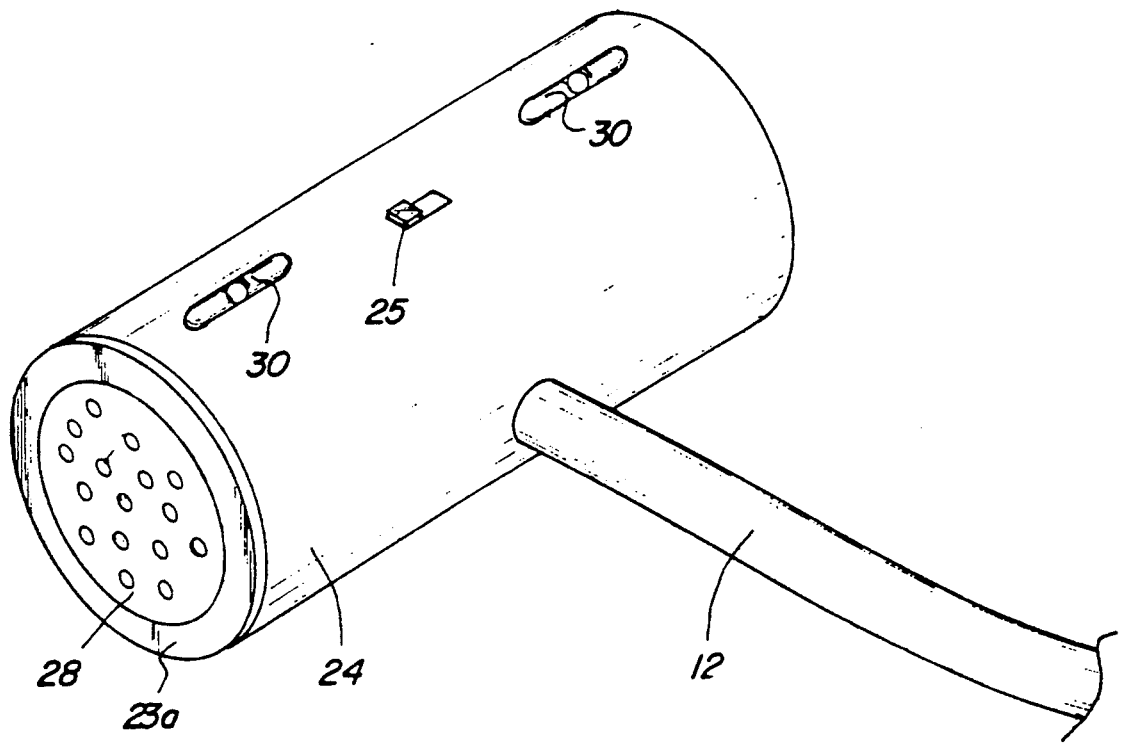
FIG. 9 is an isometric illustration of the invention having spirit level construction for use with the alarm system of the invention.

With reference now to the drawings, and in particular to FIGS. 1 to 9 thereof, a new and improved vehicular cover lock apparatus embodying the principles and concepts of the present invention and generally designated by the reference numeral 10 will be described.

More specifically, the vehicular cover lock apparatus 10 of the instant invention essentially comprises a cable anchor block 11 having a cable sheath 12 fixedly and medially mounted relative to the anchor block's side wall 24. The cable sheath includes a plurality of elongate flexible cable members 13 coextensively directed through the cable sheath 12 for imparting flexibility and strength to the cable sheath. A cable ring 15 is mounted to an outer distal end of the cable sheath, with an anchor block ring 14 mounted to the anchor block side wall 24 to permit additional tethering of the anchor block to an interior portion of the vehicle 19. Specifically as illustrated in FIG. 1, the anchor block 11 is mounted within the vehicle passenger compartment 20 and upon closure of the door 21, traps the anchor block 11 within the passenger compartment as illustrated. Subsequently, the cable sheath 12 and the associated cable ring 15 are directed through a vehicular cover grommet 17 of a flexible vehicle cover 16. A lock member 18 is subsequently mounted through the cable ring 15 to permit unwarranted removal of the vehicular cover 16 relative to the associated vehicle 19.

The FIGS. 6–9 illustrate a modified anchor block 11a having an interior anchor block cavity formed with an on/off switch 25 directed through the side wall 24. An anchor block first end wall 22 includes a battery access plug 27 threadedly removed relative to the first end wall 22 for access to a battery 26 that is mounted to an interior portion of the access plug 27, whereupon removal of the access plug 27 permits the battery 26 to be withdrawn simultaneously from within the anchor block cavity for replacement and maintenance of the battery 26. An audible speaker member 28 is directed through the second end wall 23 and operative through the on/off switch 25 and the battery 26 for actuation upon displacement of a mercury switch 29. The mercury switch 29 is positioned within a vehicular passenger compartment in a preoriented manner, to include at least one spirit level 30 mounted to the side wall 24 to provide for proper alignment of the mercury switch. Subsequently, the on/off switch 25 is directed to a closed position and upon disturbing of the anchor block 11a, displacement of the mercury switch 29 is effected completing electrical communication between the battery 26 and the audible speaker 28, along with an amplifier portion 28a to provide for audible alarm to indicate disturbing of the lock structure 10.

It should be noted that the anchor block 11, as illustrated in FIG. 1, may be further provided with the tether line "T", in a manner as described above for enhanced securement of the anchor block within the vehicular passenger compartment 20, with the tether line "T" arranged for securement within any of various components within the passenger compartment.

It should be noted that the speaker 28 may be utilized independently or may in fact be incorporated into further speaker members within the vehicle and speaker members exteriorly of the vehicle. Further it should be understood that the alarm structure may be arranged if desired to interface with an existing alarm structure of the vehicle to actuate such. Such circuitry may be contained within the anchor block and arranged for actuation upon attempted disturbance of the organization relative to an existing vehicle.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicular cover lock apparatus, comprising,
   a flexible cover, the flexible cover having at least one grommet opening directed therethrough, and
   a flexible cable sheath, the flexible cable sheath including a cable sheath forward distal end, the cable sheath forward distal end including a cable ring fixedly mounted thereto, and
   the cable sheath having a rear distal end, with the rear distal end including an anchor block fixedly mounted thereto, the anchor block including an anchor block ring adapted for securement to a tether line within a vehicular passenger compartment, and the flexible cable sheath includes a plurality of flexible cable members directed coextensively throughout the cable sheath, and the anchor block includes an anchor block cavity within the anchor block, the anchor block formed with an outer side wall, a first end wall spaced from a second end wall, and the side wall having an on/off switch directed therethrough, and the cavity including a battery member, and a further switch and a speaker member within the cavity in electrical communication with the on/off switch.

2. An apparatus as set forth in claim 1 wherein the first end wall includes an access plug, the access plug threadedly received within the first end wall, and the access plug having the battery secured to the access plug permitting ease of removal and replacement of the battery relative to the cavity.

3. An apparatus as set forth in claim 2 wherein the further switch is a mercury switch, whereupon unauthorized repositioning of the anchor block effects closure of the mercury switch and actuation of the speaker.

4. An apparatus as set forth in claim 3 wherein the speaker is directed through the second end wall.

5. An apparatus as set forth in claim 4 wherein the side wall includes at least one spirit level fixedly contained within the side wall permitting alignment of the anchor block to maintain the mercury switch in a first opened position to electrically disengage the speaker relative to the battery, whereupon displacement of the anchor block to a second position relative to the first position effects closure of the mercury switch to effect actuation of the speaker.

* * * * *